Figure 12:
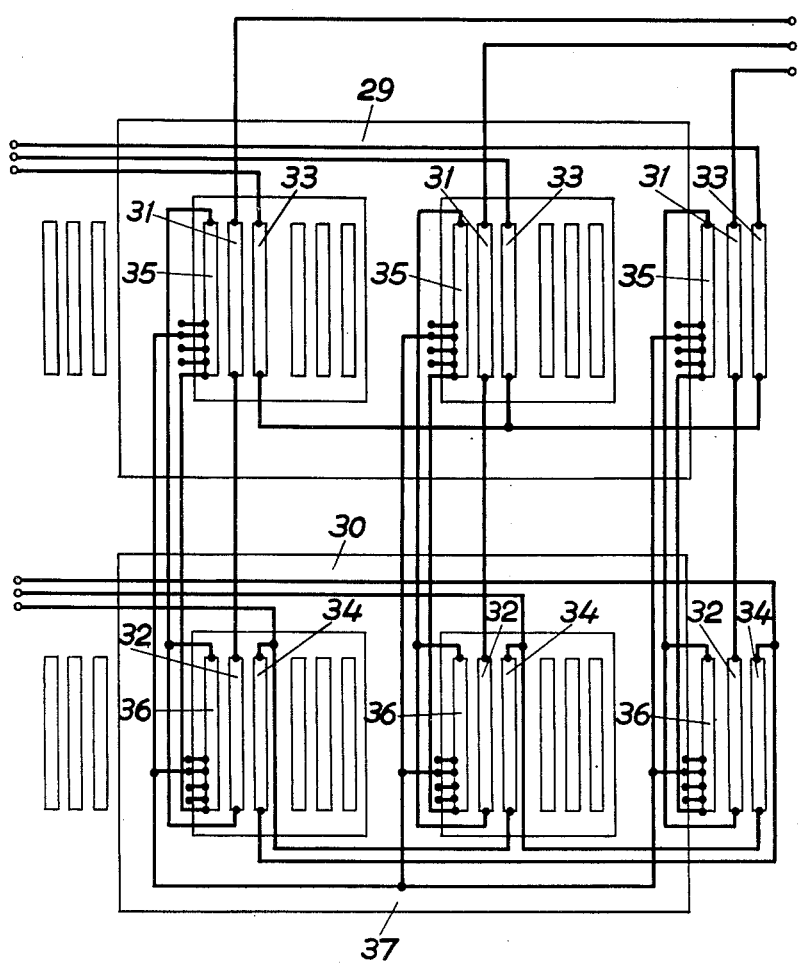

Dec. 9, 1952 E. UHLMANN 2,621,319
ARRANGEMENT OF STATIC CURRENT CONVERTERS
Filed Jan. 17, 1951 7 Sheets-Sheet 1
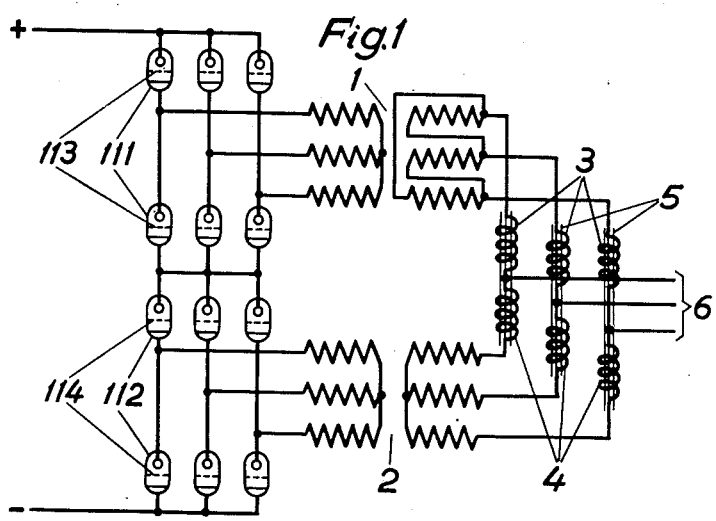
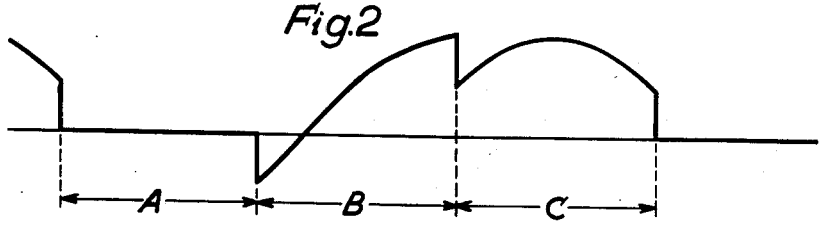
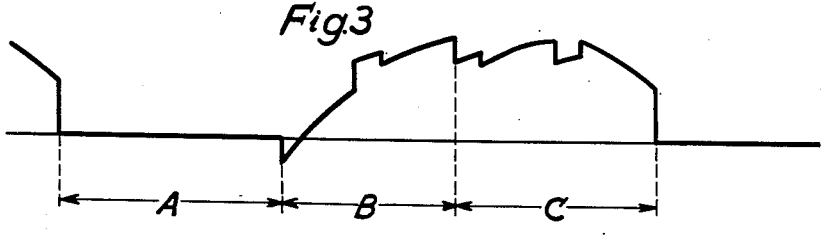
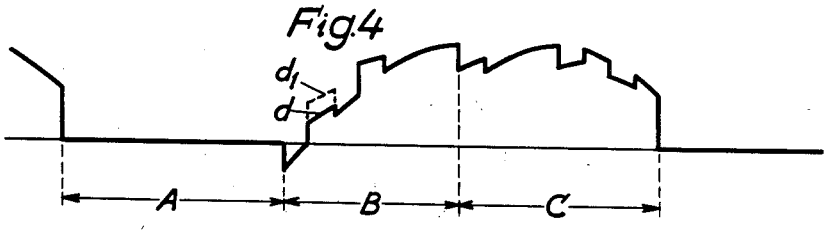
Inventor
Erich Uhlmann
By [signature]
Attorney.

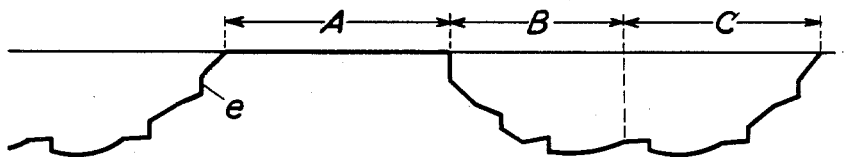
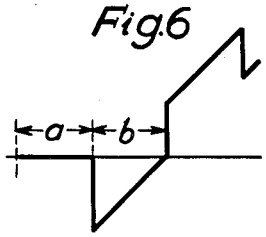
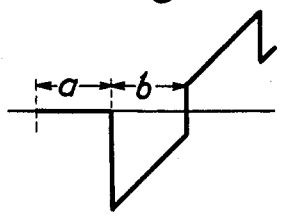
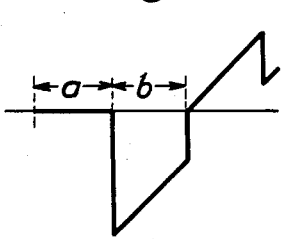
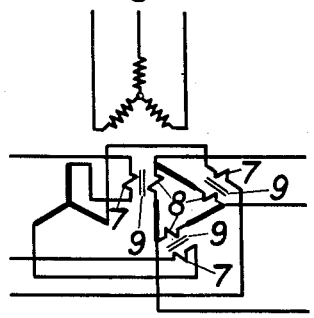
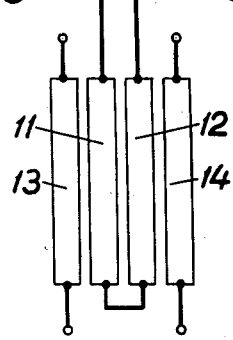
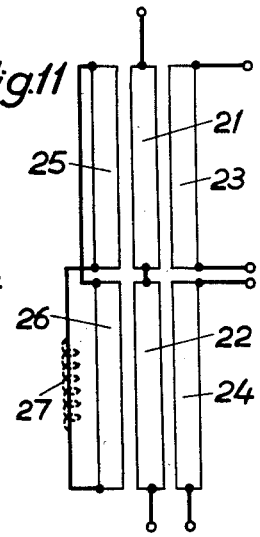

Dec. 9, 1952　　　　　　E. UHLMANN　　　　　　2,621,319
ARRANGEMENT OF STATIC CURRENT CONVERTERS
Filed Jan. 17, 1951　　　　　　　　　　　　7 Sheets-Sheet 3

Inventor
Erich Uhlmann
By
Attorney.

Dec. 9, 1952 E. UHLMANN 2,621,319
ARRANGEMENT OF STATIC CURRENT CONVERTERS
Filed Jan. 17, 1951 7 Sheets-Sheet 5

Inventor
Erich Uhlmann
By [signature]
Attorney

Dec. 9, 1952        E. UHLMANN        2,621,319
ARRANGEMENT OF STATIC CURRENT CONVERTERS
Filed Jan. 17, 1951        7 Sheets-Sheet 6
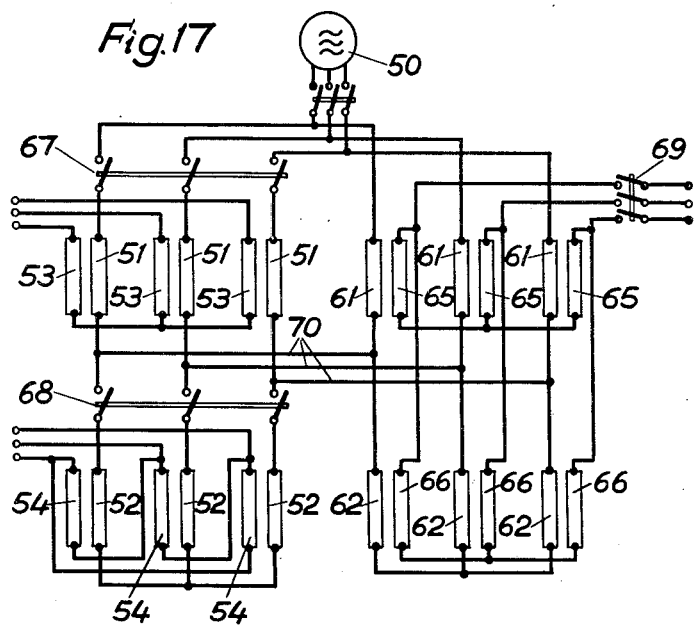
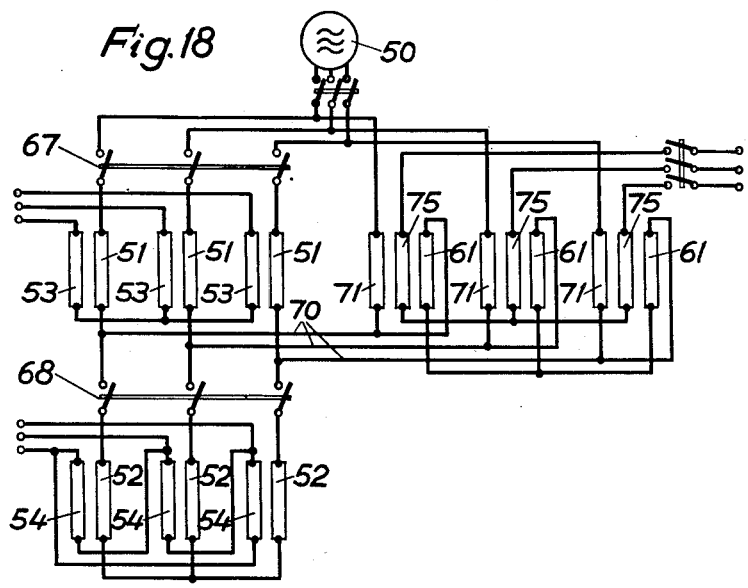
Inventor
Erich Uhlmann
By
Attorney.

Dec. 9, 1952 E. UHLMANN 2,621,319
ARRANGEMENT OF STATIC CURRENT CONVERTERS
Filed Jan. 17, 1951 7 Sheets-Sheet 7

Inventor
Erich Uhlmann
By
Attorney.

Patented Dec. 9, 1952

2,621,319

UNITED STATES PATENT OFFICE 2,621,319

ARRANGEMENT OF STATIC CURRENT CONVERTERS

Erich Uhlmann, Ludvika, Sweden, assignor to Allmanna Svenska Elektriska Aktiebolaget, Vasteras, Sweden, a Swedish corporation Application January 17, 1951, Serial No. 206,331
In Sweden January 24, 1950

21 Claims. (Cl. 321—27)

1

Of static current converters, which may be rectifiers or inverters, two or more are frequently connected in series or in parallel with a certain mutual phase displacement to constitute a composite converter for increasing the number of pulsations of the direct current voltage during each alternating current cycle—in the following for the sake of shortness termed the pulse number—and thereby facilitating the smoothening of the direct current and at the same time making the alternating current more nearly sine-shaped. The parallel connection may serve only this purpose, while the series connection also for instance may serve the purpose of adapting the converter to a transmission line for high voltage direct current. In rectifiers such a connection under different phase affords no difficulty although, as is explained below, it may retard the commutation, but in inverters, as also explained below, certain difficulties will meet in completing the commutation and the subsequent deionisation of the recently extinguished valve path on account of the harmonics which the commutation of one constituent inverter introduces in the voltage curve for the other one or ones. The present invention provides means for surmounting these difficulties.

In the accompanying drawing, Figure 1 shows diagrammatically a twelve pulse rectifier or inverter according to the invention and Figures 2-8 voltage diagrams for one of the valve paths of said rectifier or inverter under various conditions, while Figures 8-20 show different modifications of the present invention.

Figure 1 shows diagrammatically a static current converter, acting for instance as an inverter and having two transformers 1, 2 connected in parallel to a threephase line. Of the transformer windings connected to the line—in the following referred to as the line windings, as they are the primary windings in a rectifier but the secondary ones in an inverter—that of the transformer 1 is delta connected and that of the transformer 2 star connected, so that a phase displacement of 30 degrees is created between the voltages of the individual winding elements of both. The other windings of the two transformers—referred to as the valve windings—may be star connected, as shown, and each of these are connected in a usual manner, to six unidirectional current valve paths 111, 112, forming together with these a six pulse rectifier or inverter. Certain of said valve paths may be situated in a common vessel having a common cathode. These are mutually connected in series on the direct current side, and as they operate displaced in phase by 30°, they constitute together a twelve pulse converter, i. e. one in which the traversing power undergoes twelve pulsations during each cycle of the alternating current. The interphase transformers 3, 4 by which the main transformers are connected to the threephase line will be referred to later. The valves are provided with control grids 113, 114 or corresponding devices for determining the instants of commutation therein. The circuits for operating said grids may be of any type described before and are therefore not shown. Also the valves may have any means known or described before for protection against disturbances, as overvoltages, overcurrents or failures of commutation.

Figure 2 shows the usual voltage diagram for one of the valve paths shown in Figure 1, under the presumption, as an example, that the commutation takes place 30° in advance of the point of intersection of the voltage curves, and that the commutation takes place instantaneously so as not to effect the voltages. The curves represent the voltage between the anode and the cathode of any of the valves. During one third of a cycle, when the valve path in question is active, the voltage across the same is zero (time A). The following third part of a cycle commences 30° before the zero passage of the voltage, and during the time until the zero passage, the deionisation and blocking of the recently active valve path take place. The voltage across said valve path then becomes positive and increases along a sine curve to a maximum value corresponding to the voltage between two alternating current phases. 90° after the zero passage it is relieved by the voltage between the originally active phase and the third alternating current phase, which voltage lies across the valve path in question during the third part C of a cycle.

Figure 3 shows the modifications which a voltage curve according to Figure 2 for a sixpulse inverter undergoes by the commutations under the assumption that each commutation lasts by 15°. The voltage across the valve path in question will then be zero during these 15°, corresponding to the time of commutation, and only 15° will be left for the deionisation. After a time of 60°, counted from the beginning of the aforesaid commutation, and in the commutation with 60° intervals, commutation in the other phases will begin, which cause the dentations shown in the voltage curve. The voltage curve thus modified is well-known and has no unfavorable influence on the commutation and deionisation of the valve path for which the voltage curve is drawn, apart from the already mentioned shortening of the deionisation time by an amount corresponding to the commutation time.

Figure 4, on the contrary, shows a corresponding voltage curve for a twelve pulse inverter, for instance that shown in Figure 1. As aforesaid, the two six-pulse voltage systems of the said inverter are displaced by 30° with respect to each other. Such a displacement can of course be obtained by various other connections, well-known per se, than that shown in Figure 1, for instance by different kinds of zig-zag connections.

In this case, already at a time of 30° after the commutation from the valve path for which the voltage curve is drawn, a commutation takes place between a pair of valve paths belonging to the other six-pulse system, which commutation influences the actual voltage path as by the dentation $d$. In what degree the actual voltage curve will be influenced by this commutation depends on various factors, and the influence will of course not be as defined as that illustrated by the voltage dentations illustrated in Figure 3, the height of which is determined once for all, while only their length depends on the time of commutation. The height of the additional commutation dentations, which are added by the twelve-pulse connection, on the other hand, depends on the inductive interlinking between the two six-pulse systems, since the dentations are transmitted by this interlinking. At any rate it causes, if no special steps are taken, a sudden rise of the voltage, which with the presumed spaces of time for commutation and deionisation sets in already at the end of the deionizing period, while according to Figure 3 the voltage rises only gradually. If the inductive interlinking has its theoretical maximum value, the height of the dentation will correspond to the dotted line $d_1$ in Figure 4. In practice it will always have a smaller value, corresponding for instance to the dentation shown in full lines. Later occurring commutation dentations derived from the other six-pulse system are of less importance, whence they are not considered here.

In a rectifier, where the voltage across a valve path follows the curve shown in Figure 5, only those commutation dentations will act disturbing which occur at the beginning of the active interval $A$. By such dentations $e$, the voltage across the valve path may be kept negative for a longer time than would be the case for a voltage curve showing no commutation dentations, whereby the commutation is retarded with respect to that intended by a certain setting of the grid control, which will cause a lowering of the power factor and of the direct current voltage.

If the pulse number is higher than 12, which for instance may be obtained by series connection of more than two constituent converters having less than 30° mutual phase displacement, the number of commutation dentations will be higher, and they will occur at shorter intervals. Hereby the need of special precautions for suppressing the said dentations may be still more urgent than in a twelve-pulse connection.

According to the present invention, steps are now taken for compensating more or less the influence of the mutual inductance between the alternating current circuits, forming part of the constituent converters, on the voltage curve of the valve paths of one constituent converter at a commutation of another constituent converter, which influence presents itself as a translation of the commutation dentations. The compensation may be carried so far, that the transferred commutation dentations entirely disappear or even change direction, but sometimes it may be sufficient only to reduce the amplitude of these dentations.

One measure for introducing a compensation of the aforesaid kind may be to connect in series or in parallel to the line, with respect to the converter, a capacitor which more or less compensates the proper inductance of the line network. In practice it is, however, found that other steps lead more readily to the desired result, the comprehensive feature of which steps may be so expressed that the short-circuit reactance measured between the valve windings of the transformers of two separate constituent converters is larger than the sum of the shortcircuit reactances measured between said valve windings and the alternating current line. In this way, the so-called three circuit reactance, looking from the line, will be negative, and if it obtains a sufficiently high negative value, i. e. numerically equal to the line network reactance, it may entirely compensate the latter. As the algebraical sum of the said three-circuit reactance and the line network reactance has been found to be decisive for the translation of the commutation dentations from one constituent converter to the other, the transferred dentations may hereby be caused to disappear or to change sign.

A simple method of obtaining a relation between the components of the three circuit reactance which makes the said reactance negative is diagrammatically illustrated in Figure 1. Between the line windings $1$, $2$ of the two transformers there are connected reactor windings lying for each phase on a common iron core $5$, while the line $6$ is connected to a point between said reactor windings. These windings magnetize the core in the same sense as in a usual interphase transformer (suction transformer), but the iron cores differ from those usual in such transformers by a higher reluctance, obtained for instance by means of an airgap. If the reactance of each such reactor winding $3$, $4$ is designated by $X$, the short-circuit reactance measured between the two valve windings will be increased by $4X$ on account of the cooperation of the windings in magnetizing the iron core, while the reactance measured between each valve winding and the line will be increased only by $X$, thus their sum by $2X$. If $X$ is sufficiently large as compared with the internal reactances, the three circuit reactance will then be negative.

If the transformers of the two constituent converters are mounted on a common iron core with their windings coaxially arranged, a minor yoke should be interposed between the windings for absorbing the leakage flux caused by the difference between their voltage corresponding to the voltage across the auxiliary reactor.

If more than two constituent converters are present, the connection of the interphase transformers according to Figure 1 may be modified in the usual manner. Composite reactors of this type may also be arranged between the valve windings, although this is generally more complicated, as the valve winding elements of the two transformers have voltages mutually displaced in phase. The reactors or interphase transformer windings must therefore also be arranged with a phase displacement between the voltages at phase coincidence between the fluxes, for instance with a zig zag connection. In a twelve pulse converter, where only 30° phase displacement is necessary, and where one of the valve windings therefore may be star and the other delta connected, the reactors may for instance be connected according to Figure 9. A reactor 7, 8, respectively, is here connected in series with each phase of the valve windings of the transformer. Of these reactors, those belonging to the delta winding and designated by 8 are connected between the phases and the terminals of said winding and have a number of winding turns which is $\sqrt{3}$ times that of the reactors 7 belonging to the star-connected winding. Each pair of reactors of the same phase has a common core 9. The connections left and right lead each to one constituent converter.

Another way of obtaining the desired relation between the components forming part of the three circuit reactance in a twelve-pulse connection is to place the two valve windings of a common transformer concentrically on both sides of the line winding and to connect them each to one constituent converter. A transformer of this general type is known per se but very seldom used, whence its use in the present case would be very improbable without the deliberations on which the present invention is founded. The intended action of this arrangement of the valve winding is further reinforced if also the line winding is divided into two concentrical windings, as shown in Figure 10, where the two series-connected halves of the line winding are designated by 11, 12 and those of the valve winding by 13, 14. The desired action here depends on the fact, that the channel width, which according to theory determines the leakage between the two valve windings, comprises also the whole width of the line winding (and possibly the width of the channel between its two halves), while the channel widths, which define the leakage between each valve winding and the line winding, only comprise a small portion of the width of the line winding.

Still another arrangement for the same purpose is shown in Figure 11. Here the line winding is divided into two series connected portions 21, 22 lying lengthwise on the same core (not shown), possibly on two separate cores or with a small intermediary yoke on the common core for absorbing leakage fluxes. In using three single-phase transformers, the winding portions 21, 22 may lie each on one leg of each core. To each such leg there corresponds a valve winding 23, 24 respectively, each of which windings is connected to one constituent converter. Further, there are two windings 25, 26 on the other side of the line winding (inside if the windings 23, 24 are outside and vice versa), said windings 25, 26 being connected mutually in parallel and only serve the purpose of equalizing. Between these windings, there may be connected a reactor 27, indicated in dotted lines.

The manner of operation of the arrangement shown in Figure 11 will be essentially analogous to that of Figure 10. The direct leakage between the windings 23 and 24 may be regarded as infinite as compared with the indirect one, acting in parallel thereto, through the intermediate of the windings 25 and 26, which will be the sum of the leakage between the windings 23 and 25 and that between the windings 26 and 24, possibly increased by the value of the reactor 27 if present, thus for a corresponding dimensioning substantially larger than in Figure 10. The leakage between either of the valve windings and the line windings is, on the other hand, less influenced by the equalizing winding.

The equalizing winding may, if desired, be connected in series with the line winding, either directly or through a series transformer, and in such case it may cooperate with or oppose the line winding. By making such a series transformer with adjustable ratio the equalizing winding may also be used for voltage regulation.

When applying the form according to Figure 11 to a combination of more than two constituent converters the line windings of all the constituent converters are connected in series and the corresponding equalizing windings in parallel. A reactor corresponding to 27 may then be connected in series with each of the equalizing windings.

Two or more of the forms shown in Figures 9–11 may as a rule be combined for obtaining a reinforced action.

In the forms described which operate with equalizing windings, it has been found that the practical value of said forms may be further increased if the equalizing windings are so arranged as to be able to fill other functions besides that of equalizing. If they have only the latter function, they will only represent a comparatively small power in normal operation, but in order to make it possible to operate the installation provisionally with less than the whole number of constituent converters, the equalizing windings should preferably be dimensioned for an essentially larger power, for instance with two constituent converters for about one fourth of the total power. Since such an operation occurs rather seldom, it has been found advisable, for the best possible utilisation of the transformer, to dimension the equalizing winding for a larger power than the highest possible power of equalisation, so that it may also be utilized for other purposes. Figures 12–20 show diagrammatically different forms of connections for this purpose.

Figure 13:
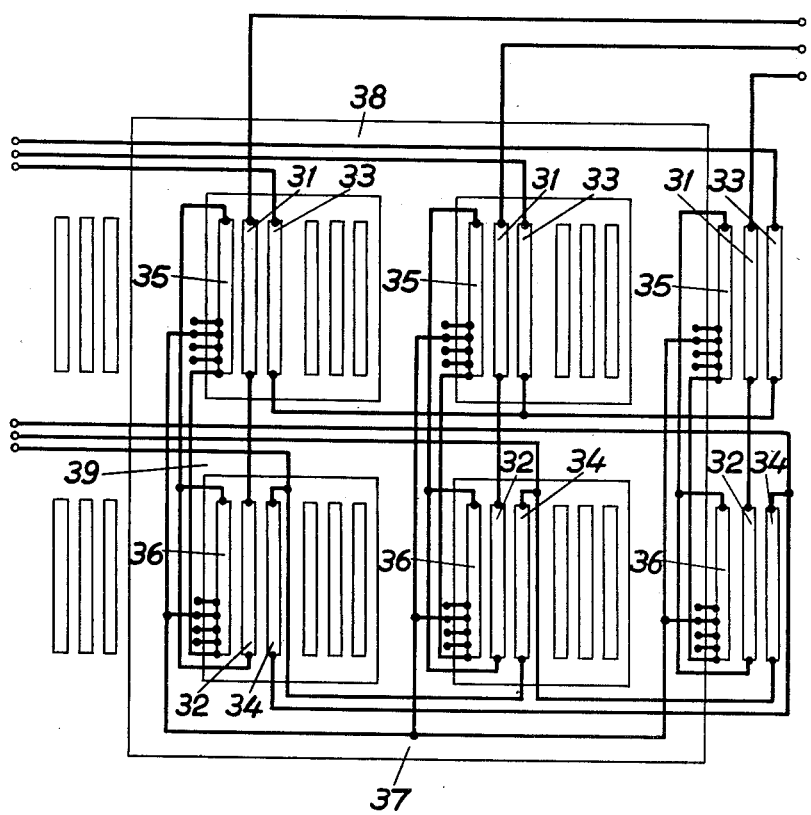
Figure 14:
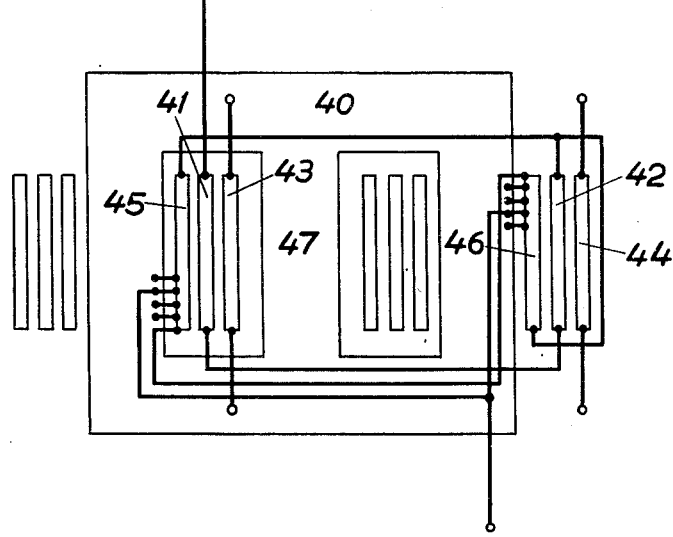

Figures 12–14 show connections, in which the equalizing windings serve also voltage regulation, and differ mutually only by different examples of arranging the transformer cores in a three-phase connection. In Figure 12, two three-legged cores 29, 30 are employed, each of which carries three threephase windings, namely the line windings 31, 32 respectively, the valve windings 33, 34 respectively, and the equalizing windings 35, 36 respectively. Of the two valve windings, one 33 is star connected and the other 34 delta connected for giving the desired phase difference between the alternating current voltages of the converter valves. The equalizing windings are, as in Figure 11, connected in parallel for each phase, but they are also both together connected in series with the line windings and provided with several taps which may be alternatively connected to the common neutral point 37 for regulating the ratio.

Figure 13 shows the only difference with respect to Figure 12 that a common transformer core 38 with an intermediary yoke 39 is employed. The windings are arranged, connected and designated in the same way as in Figure 12.

In Figure 14, the threephase transformer connection is supposed to be divided into three singlephase transformers, only one of which is shown, as the other ones are exactly equal. The core 40 of the said transformer has a non-wound middle leg 41 which corresponds to the intermediary yoke in Figure 13, while the two series-connected portions 41, 42 of the line winding are placed each on one side leg, as are also the two corresponding valve windings 43 and 44 and the two parallel connected portions 45 and 46 of the equalizing winding serving also as a regulating winding.

Figure 15:
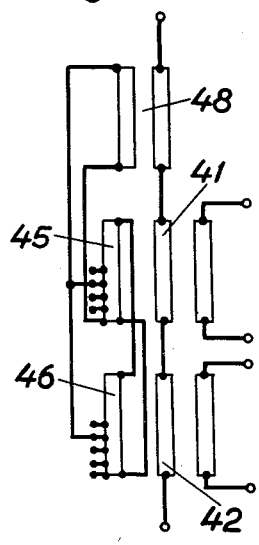

For very high line voltages, it may be advisable, for facilitating the voltage regulation, to employ a connection according to Figure 15, which also shows only one phase, and in which a separate series transformer 48 is on its primary side connected in series with the line windings 41, 42 and on its secondary side connected to the windings 45, 46.

It may often be advisable that the equalizing winding fills a more important function than to serve only ratio regulation, and Figures 16–20 show different examples hereof. In all these figures, as in Figures 10 and 11, the transformer windings are shown without cores, as their place in relation to the cores will be obvious.

Figure 16:
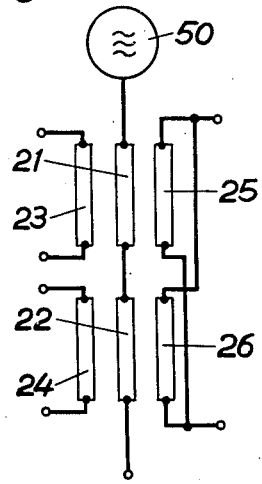

If an inverter is operated without a forced commutation, it needs as a supplement a phase compensator, generally a highly magnetized synchronous motor running idle ("synchronous compensator"). As such a compensator frequently must be of a higher kVA. number than the line network fed by the inverter, and as especially its reactance defining the commutation conditions should be only a small portion of the minimum reactance of the line network, the compensator will deliver to the inverter a considerably larger current than that drawn therefrom by the line. It may therefore be advisable to connect the winding, which in Figures 10–15 has been designated as the line winding, to the compensator and instead the equalizing winding to the line proper. Three examples hereof are shown in Figures 16–18. Figure 16 is nearly equivalent to Figure 11 and only shows the difference with respect to the latter, that the windings 21 and 22 are shown as connected to the synchronous compensator 50, while the equalizing windings 25, 26 are connected to the external line and the windings 23, 24, as before, to the inverter valves.

The hitherto described forms have the inconvenience, that on a disturbance in a constituent converter it is not possible or at least rather difficult to disconnect this constituent converter alone, but the whole installation must be made inoperative. Such a disconnection of a constituent converter alone without disturbing the rest of the installation is very desirable, and then it is also desirable that the synchronous compensator remains in circuit so that it will not fall out of step. This manner of operation is made possible by one of the connections shown in Figures 17 and 18. In these, the windings connected to the synchronous compensator are divided between two separate transformers or transformer pairs, the cores of which are not shown.

In Figure 17, the windings on one transformer pair connected to the synchronous compensator 50 are designated by 51 and 52 and these on the other transformer pair by 61 and 62. On the first-named transformer pair, the valve windings 53 and 54 are situated, and on the second transformer pair the windings 65 and 66 serving the equalisation and the feeding of the line. Each transformer pair may, in analogy with Figure 13, be arranged as a single transformer with an intermediary yoke or be subdivided into three singlephase transformers in analogy with Figure 14. The operation under normal conditions will be substantially equal to that of Figure 16. On a disturbance in a constituent converter, the latter may be disconnected by the threepole switch 67 or 68, while the synchronous compensator remains connected to the line. By the cross connections 70, the lower half of a transformer pair remains in circuit, even if the upper half is disconnected.

Figure 18 shows a simplification of the connection according to Figure 17 implying that the two halves of the transformer or transformer pair connected to the line are combined to form a single transformer which has two mutually series-connected winding portions 71, 61 connected to the synchronous compensator. Geometrically between these winding portions, the winding 75 connected to the line is placed. This winding is here simple and thus no equalizing winding in the same sense as in Figures 16 and 17, but by its position between the two winding portions 71, the large space is utilized which should be found between these winding portions in order to created the desirable reactance. This reactance, in its turn, by the windings 51, 52 in the other transformer pair influences the reactance between the valve windings 53, 54 so as to satisfy the conditions set for said last-mentioned reactance. Generally this method may be applied when series-connected winding belonging to different constituent converters are placed on a common transformer core. For instance, Figures 12 and 13 may be modified in a corresponding manner. Instead of utilizing an equalizing winding for other purposes, the winding distance required for creating a corresponding leakage is then utilized for placing a separate winding which may be utilized in the corresponding manner.

Also in Figure 18 a valve winding may be cut out by means of the switch 67 or 68 without disturbing the operation of the rest of the apparatus. The cross-connections 70 contribute to this mode of operation.

Figure 19:
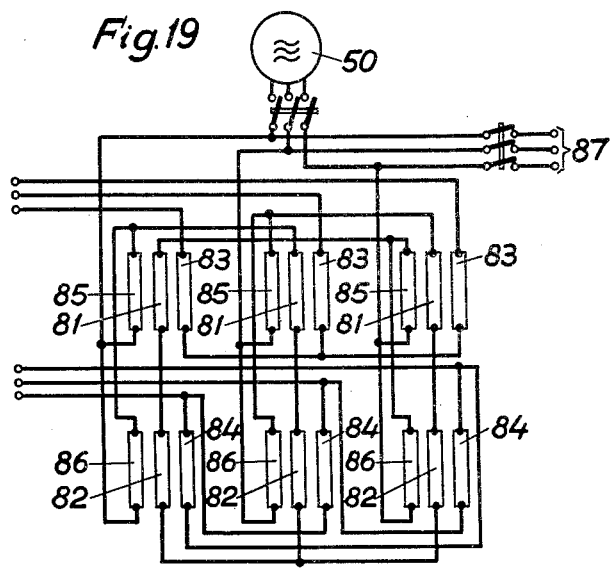

In Figure 19 there are connected in series, between each terminal of the synchronous compensator 50 and a neutral, two pairs of parallel windings 85, 86, belonging to one phase, and two series-connected windings 81, 82 belonging to another phase, whereby a zig zag connection is obtained. The windings 85 and 86 mutually, and the windings 81 and 82 mutually, lie on different threephase cores, which may be combined in one and only separated by an intermediary yoke. The zig-zag connection is here primarily intended to create a small phase displacement in relation to the external voltage, for instance 7.5° in either direction of two transformers, while a mutual phase displacement of 30° between the two valve systems connected to the line is obtained by a star connection of one valve winding 83 and a delta connection of the other valve winding 84 in the usual manner. The line is here connected to the same winding system as the synchronous compensator.

Figure 20:
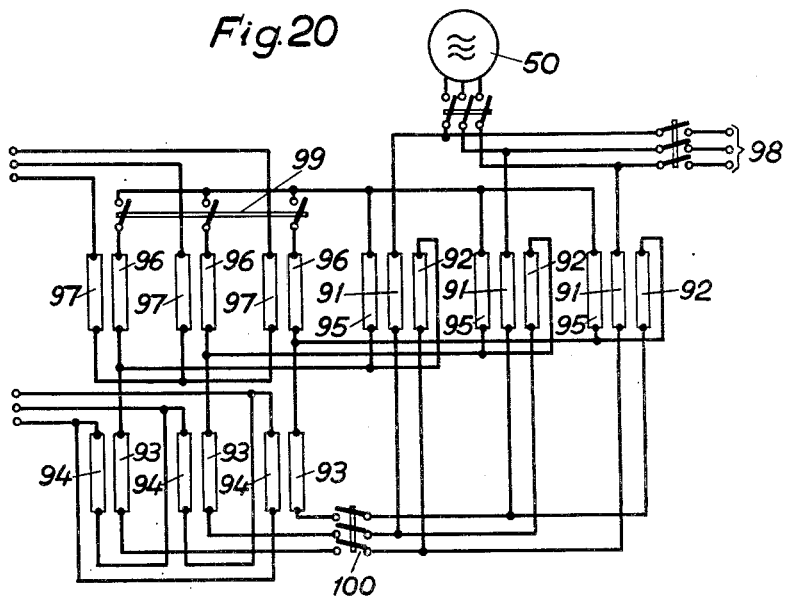

Figure 20 differs from Figure 19 in essentially the same way as Figure 18 differs from Figure 16, namely, in that a valve winding can be cut out without disturbing the rest of the operation. For this purpose, the windings are distributed over three separate transformers. Starting from the synchronous compensator 50 and the line 98 connected thereto, each phase first contains a winding 91 on the right transformer and in series therewith another winding 92 of another phase on the same transformer, whereby a zig-zag winding is obtained. In parallel to the last-mentioned winding, there is a winding 93 on one of the converter transformers (the lower one in the diagram) which further carries a valve winding 94. A third winding 95 on the first-named transformer is connected in parallel to the winding 92 (although said windings have separate neutrals in the three-phase diagram) and also in parallel to a winding 96 on the other (upper) converter transformer, which further has a valve winding 97. Here the condition of reactances is fulfilled substantially by the large leakage between the windings 92 and 95 caused by the large distance therebetween. At the same time, these windings form part of the zig-zag connection. Either converter may be cut out on a local disturbance by means of a switch 99 or 100, as in Figure 18.

The compensation of the commutation dentations derived from other constituent converters which is obtained according to the present invention may, as aforesaid, be carried so far that the said dentations disappear or even change their sign. Often it may, however, be sufficient to reduce these dentations materially, and such a measure may be supplemented by a starting of the commutation at an earlier instant. Both these measures imply an increased demand of reactive power, and they must therefore be weighed against each other in each particular case. It is then also to be observed, that the common line reactance is not constant but varies with the load of the line network. In such a case, the compensation members may be adjusted automatically or by hand so as to be adapted to the line reactance, for instance by means of a ratio adjuster. As it is generally not practically advisable to make this adaption complete, the compensation may for instance be so dimensioned as to be by hundred percent at a high load on the line—which generally corresponds to a low reactance—and thus incomplete at a lower load which also facilitates a shorter time of commutation.

At an incomplete compensation it must be borne in mind, that the time available for deionisation is not simply extended by an earlier starting of the commutation. Figures 6–8 serve to illustrate this fact. Figure 6 shows on a larger scale than Figure 4 the voltage curve during and immediately after the commutation from a recently active valve path. The commutation time is designated by $a$ and the time available for deionisation by $b$. It has been assumed in the example illustrated, that the following commutating dentation which is inductively transferred to this valve path begins at the very instant when the voltage curve undisturbed by such dentations would pass through zero. Under stationary conditions, therefore, the said dentation will cause no difficulty, but if it is attempted to extend the time available for deionisation by an earlier starting of the commutation, it is found that such an earlier starting for instance according to Figure 7 has no influence on the length of the time $b$ available for commutation, since this time is still limited by the steeply ascending commutation dentation, which makes the voltage across the valve path positive after an equally short time as in Figure 6. Only a further displacement to the position shown in Figure 8 or somewhat more involves an extension of the time available for the deionisation. The value of this displacement depends on the height of the commutation dentation, i. e. on the compensation of the mutual inductance obtained by the invention.

If, for some reason, it is not intended or not possible to achieve a complete compensation of the transferred dentations of commutation, it is of particular importance to pay respect to the just described circumstances when a rapid regulation of an inverter is intended. Such a regulation has, in many cases, for its purpose to increase the time available for commutation and deionisation, if the actual one is insufficient and therefore causes the risk of a commutation failure. In this case it must be observed, that in the case of commutations following each other as rapidly as is the case for a pulse number of 12 or more, the time for the commutation already started with subsequent deionisation runs the risk of being shortened by any step intended to extend the time for the other commutations, provided that the transferred dentations are not completely compensated. For instance in Figure 6 this means, that during commutation from the valve path illustrated by the diagram, the dentation created by the subsequent commutation is displaced to the left and the voltage thus becomes positive earlier than shown in the figure, whereby the total time for commutation and deionisation is reduced. It is therefore especially important, that the regulator function is not too rapid, so that the said reduction is not made too large. The speed of regulation should thus preferably be smaller at an incomplete compensation than would be possible at a complete one. It may also be advisable to make the speed of regulation at a displacement in the direction of an earlier commutation smaller than at a displacement in the opposite direction.

A reduction or compensation of the mutual inductance between two valve windings operating at a mutual phase displacement according to the present invention has, besides the favorable influence on the commutation, also the advantage, that a disturbance in the inverter connected to one valve winding influences the other inverter in a smaller degree than if no such steps were taken. There will thus be better possibilities to limit the extent of an occurring disturbance.

I claim as my invention:

1. A static current converter installation comprising a plurality of constituent current converters having ionic valves and differing in phase on the alternating current side and means compensating the influence of the common inductance of the alternating current circuits of said converters on the voltage curves of the valves of one constituent converter at the commutation of another constituent converter.

2. A static current converter installation comprising alternating current circuits, a plurality of constituent current converters connected to said circuits and having ionic valves and differing in phase on the alternating current side, and means serving to compensate the influence of the common inductance of the said circuits of said converters on the voltage curves of the valves of one of the constituent converters at the commutation of another of the constituent converters.

3. A static current converter installation comprising an alternating current line, a plurality of constituent current converters connected to said line and comprising transformers and ionic valves and differing in phase on the alternating current side, and reactance means between the valve windings of the transformers of two separate constituent converters, the reactance of said means being larger than the sum of the reactances measured between each separate valve winding and the alternating current line.

4. A static current converter installation comprising an alternating current line, a plurality of constituent current converters connected to said line and comprising transformers and ionic valves and differing in phase on the alternating current side, and reactance means between the valve windings of the transformers of two separate constituent converters mutually and between said windings and the alternating current line, the reactance of said means between said valve windings mutually being larger than the sum of the reactances measured between each separate valve winding and the alternating current line.

5. A static current converter installation comprising an alternating current line, a plurality of constituent current converters connected to said line and comprising transformers and ionic valves and differing in phase on the alternating current side, reactor windings connected in series with the line windings of said transformers, and iron cores common to said reactor windings of different constituent converters.

6. A static current converter installation comprising an alternating current line, a plurality of constituent current converters connected to said line and comprising ionic valves and transformers having windings connected to said line and to said valves, the transformers of different constituent converters differing in phase with respect to said line, the valve windings of said transformers being divided into two concentric portions each situated on either side of the winding of the same transformer connected to the alternating current line.

7. A static current converter installation as claimed in claim 6, in which also the said line connected windings of said transformers are divided into two concentric portions each, separated by an intermediary channel.

8. A static current converter installation comprising an alternating current line, a plurality of constituent current converters differing in phase and comprising ionic valves and transformers having line windings and valve windings, said line windings being connected in series to said line and combined with equalizing windings, said equalizing winding being mutually connected in parallel, and said valve windings being connected to valves of different constituent converters.

9. A static current converter as claimed in claim 8, in which said equalizing windings are situated on the opposite side of said line windings against said valve windings.

10. A static current converter as claimed in claim 8, in which said equalizing windings are parallel-connected through reactive means.

11. A static current converter installation comprising a plurality of constituent current converters having ionic valves and differing in phase on the alternating current side, means for partially compensating the influence of the common inductance of the alternating current circuits of said converters on the voltage curves of the valves of one constituent converter at the commutation of another constituent converter, and means for displacing the instant of starting said commutation towards an earlier instant.

12. A static current converter installation comprising a plurality of constituent current converters having ionic valves and differing in phase on the alternating current side, means for partially compensating the influence of the common inductance of the alternating current circuits of said converters on the voltage curves of the valves of one constituent converter at the commutation of another constituent converter, and a voltage regulator having a regulating time of more than a normal commutation period acting to displace the instant of starting the commutation in an earlier direction.

13. A static current converter installation comprising a plurality of constituent current converters having ionic valves and differing in phase on the alternating current side, means for partially compensating the influence of the common inductance of the alternating current circuits of said converters on the voltage curves of the valves of one constituent converter at the commutation of another constituent converter, and a voltage regulator acting by displacing the instant of starting the commutation of said converter installation and having a lower regulating speed at a displacement in an earlier direction than in the opposite sense.

14. A static current converter installation as claimed in claim 1 connected to feed a line network, in which the compensation means are adjustable in relation to the reactance of said line network.

15. A static current converter installation comprising an alternating current line, a plurality of constituent current converters differing in phase and comprising ionic valves and transformers having line windings and valve windings, said line windings being connected in series to said line, equalizing windings on said transformers connected mutually in parallel and serving also other purposes than equalizing, said valve windings being connected to valves of different constituent converters.

16. A static current converter installation comprising an alternating current line, a plurality of constituent current converters differing in phase and comprising ionic valves and transformers having line windings and valve windings, said line windings being connected in series to said line, equalizing windings on said transformers connected mutually in parallel and provided with voltage taps for voltage regulation.

17. A static current converter installation comprising an alternating current line, a plurality of constituent current converters differing in phase and comprising ionic valves and transformers having line windings and valve windings, said line windings being connected in series to said line, equalizing windings on said transformers connected mutually in parallel and connected in series with line windings of a different phase to form a zig-zag connection.

18. A static current converter installation comprising an alternating current line, a plurality of constituent current converters differing in phase and comprising ionic valves and transformers having line windings and valve windings, said line windings being connected in series to said line, equalizing windings on said transformers connected mutually in parallel and connected to feed a portion of a network fed by said converter installation.

19. An inverter installation comprising an alternating current line, a plurality of constituent inverters differing in phase and comprising ionic valves and transformers having line windings, valve windings and equalizing windings, a synchronous compensator, said line windings being connected in series to said compensator, and equalizing winding being connected in parallel to feed said alternating current line.

20. An inverter installation comprising an alternating current line, a plurality of constituent inverters differing in phase and comprising ionic valves and transformers having three sets of windings, a synchronous phase compensator, said transformers being divided into two units, each of which has two windings connected to said phase compensator, one of said units carrying windings connected to said valves and the other carrying equalizing windings connected to said alternating current line.

21. A static current converter installation comprising an alternating current line, a plurality of constituent current converters differing in phase and comprising ionic valves and transformers having a common core, said transformers having series-connected line windings, equalizing windings situated between said line windings, and windings connected to said ionic valves.

ERICH UHLMANN.

REFERENCES CITED

The following references are of record in the file of this patent:

UNITED STATES PATENTS

| Number | Name | Date |
| --- | --- | --- |
| 1,655,475 | Prince | Jan. 10, 1928 |
| 2,039,034 | Rose et al. | Apr. 28, 1936 |
| 2,195,296 | Christensen | Mar. 26, 1940 |